United States Patent
Wang et al.

(10) Patent No.: US 11,854,160 B2
(45) Date of Patent: *Dec. 26, 2023

(54) CT SUPER-RESOLUTION GAN CONSTRAINED BY THE IDENTICAL, RESIDUAL AND CYCLE LEARNING ENSEMBLE (GAN-CIRCLE)

(71) Applicant: RENSSELAER POLYTECHNIC INSTITUTE, Troy, NY (US)

(72) Inventors: Ge Wang, Loudonville, NY (US); Chenyu You, Stanford, CA (US); Wenxiang Cong, Albany, NY (US); Hongming Shan, Troy, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/564,728

(22) Filed: Dec. 29, 2021

(65) Prior Publication Data
US 2022/0230278 A1    Jul. 21, 2022

Related U.S. Application Data

(63) Continuation of application No. 16/594,567, filed on Oct. 7, 2019, now Pat. No. 11,232,541.
(Continued)

(51) Int. Cl.
*G06T 3/40* (2006.01)
*G06N 3/045* (2023.01)

(52) U.S. Cl.
CPC .......... *G06T 3/4076* (2013.01); *G06N 3/045* (2023.01)

(58) Field of Classification Search
CPC ..... G06T 3/4076; G06T 3/4053; G06N 3/045; G06N 3/047; G06N 3/088; G06N 3/082
See application file for complete search history.

(56) References Cited

U.S. PATENT DOCUMENTS

2020/0111194 A1* 4/2020 Wang .................. G06N 3/045
2023/0053085 A1* 2/2023 Osunkwo .............. G06T 7/001

FOREIGN PATENT DOCUMENTS

WO    WO-2022115337 A1 * 6/2022

* cited by examiner

Primary Examiner — Charles T Shedrick
(74) Attorney, Agent, or Firm — Murtha Cullina LLP; Anthony P. Gangemi

(57) ABSTRACT

A system for generating a high resolution (HR) computed tomography (CT) image from a low resolution (LR) CT image is described. The system includes a first generative adversarial network (GAN) and a second GAN. The first GAN includes a first generative neural network (G) configured to receive a training LR image dataset and to generate a corresponding estimated HR image dataset, and a first discriminative neural network ($D_Y$) configured to compare a training HR image dataset and the estimated HR image dataset. The second GAN includes a second generative neural network (F) configured to receive the training HR image dataset and to generate a corresponding estimated LR image dataset, and a second discriminative neural network ($D_X$) configured to compare the training LR image dataset and the estimated LR image dataset. The system further includes an optimization module configured to determine an optimization function based, at least in part, on at least one of the estimated HR image dataset and/or the estimated LR image dataset. The optimization function contains at least one loss function. The optimization module is further configured to adjust a plurality of neural network parameters associated with at least one of the first GAN and/or the second GAN, to optimize the optimization function.

20 Claims, 3 Drawing Sheets

Related U.S. Application Data

(60) Provisional application No. 62/910,703, filed on Oct. 4, 2019, provisional application No. 62/742,586, filed on Oct. 8, 2018.

CT SUPER-RESOLUTION GAN CONSTRAINED BY THE IDENTICAL, RESIDUAL AND CYCLE LEARNING ENSEMBLE (GAN-CIRCLE)

CROSS REFERENCE TO RELATED APPLICATION(S)

This application is a continuation of and claims the benefit of U.S. Nonprovisional patent application Ser. No. 16/594,567, filed Oct. 7, 2019, that claims the benefit of U.S. Provisional Application No. 62/742,586, filed Oct. 8, 2018, and U.S. Provisional Application No. 62/910,703, filed Oct. 4, 2019, the entire disclosures of which are hereby incorporated by reference as if disclosed herein in their entireties.

FIELD

The present disclosure relates to recovering high resolution (HR) computed tomography (CT) images from low resolution (LR) CT images, in particular to, using CT super-resolution and adversarial learning to recover a HR CT image from LR CT images.

BACKGROUND

X-ray computed tomography (CT) is a popular medical imaging method for screening, diagnosis, and image guided intervention. The image resolution of a CT imaging system is constrained by x-ray focal spot size, detector element pitch, reconstruction algorithms, and other factors. While physiological and pathological units in the human body are on an order of 10 μm (micrometers), the in-plane and through-plane resolution of clinical CT systems are on an order of one millimeter (mm) or less. Existing CT imaging and visualization techniques can generate relatively small voxels. However, the intrinsic resolution is lower than an ideal resolution for applications such as early tumor characterization and coronary artery analysis.

SUMMARY

In an embodiment, there is provided a system for generating a high resolution (FIR) computed tomography (CT) image from a low resolution (LR) CT image. The system includes a first generative adversarial network (GAN) and a second GAN. The first GAN includes a first generative neural network (G) configured to receive a training LR image dataset and to generate a corresponding estimated HR image dataset, and a first discriminative neural network ($D_Y$) configured to compare a training HR image dataset and the estimated HR image dataset. The second GAN includes a second generative neural network (F) configured to receive the training HR image dataset and to generate a corresponding estimated LR image dataset, and a second discriminative neural network ($D_X$) configured to compare the training LR image dataset and the estimated LR image dataset. The system further includes an optimization module configured to determine an optimization function based, at least in part, on at least one of the estimated HR image dataset and/or the estimated LR image dataset. The optimization function contains at least one loss function. The optimization module is further configured to adjust a plurality of neural network parameters associated with at least one of the first GAN and/or the second GAN, to optimize the optimization function.

In some embodiments of the system, the at least one loss function is selected from the group including an adversarial loss function, a cyclic loss function, an identity loss function and a joint sparsifying transform loss function. In some embodiments, the group further includes a supervision loss function. In some embodiments, the at least one loss function includes a cyclic loss function configured to implement a cycle consistency constraint.

In some embodiments of the system, the first generative neural network (G) and the second generative neural network (F) each include a respective feature extraction network and a respective reconstruction network. Each feature extraction network includes a plurality of skip connections.

In some embodiments of the system, the first discriminative neural network ($D_Y$) and the second discriminative neural network ($D_X$) each include a respective plurality of discriminator blocks coupled in series. Each discriminator block includes a convolutional stage, a bias stage, an instance norm stage, and a leaky rectified linear unit (ReLU) stage.

In some embodiments of the system, a trained first generative neural network (G) is configured to generate a HR CT image from an actual LR CT image, the actual LR CT image corresponding to low dose CT image data.

In an embodiment, there is provided a method for generating a high resolution (HR) computed tomography (CT) image from a low resolution (LR) CT image. The method includes generating, by a first generative neural network (G), a corresponding estimated HR image dataset based, at least in part, on a received training LR image dataset and comparing, by a first discriminative neural network ($D_Y$), a training HR image dataset and the estimated HR image dataset. The first generative neural network (G) and the first discriminative neural network ($D_Y$) are included in a first generative adversarial network (GAN). The method further includes generating, by a second generative neural network (F), a corresponding estimated LR image dataset based, at least in part, on the training HR image dataset; and comparing, by a second discriminative neural network ($D_X$), the training LR image dataset and the estimated LR image dataset. The second generative neural network (F) and the second discriminative neural network ($D_X$) are included in a second GAN. The method further includes determining, by an optimization module, an optimization function based, at least in part, on at least one of the estimated HR image dataset and/or the estimated LR image dataset. The optimization function contains at least one loss function. The method further includes adjusting, by the optimization module, a plurality of neural network parameters associated with at least one of the first GAN and/or the second GAN, to optimize the optimization function.

In some embodiments of the method, the at least one loss function is selected from the group including an adversarial loss function, a cyclic loss function, an identity loss function and a joint sparsifying transform loss function. In some embodiments, the group further includes a supervision loss function.

In some embodiments of the method, the at least one loss function includes a cyclic loss function configured to implement a cycle consistency constraint.

In some embodiments of the method, the first generative neural network (G) and the second generative neural network (F) each include a respective feature extraction network and a respective reconstruction network, each feature extraction network including a plurality of skip connections.

In some embodiments of the method, the first discriminative neural network ($D_Y$) and the second discriminative neural network ($D_X$) each include a respective plurality of discriminator blocks coupled in series, each discriminator block including a convolutional stage, a bias stage, an instance norm stage, and a leaky rectified linear unit (ReLU) stage.

In some embodiments, the method further includes generating, by a trained first generative neural network (G), a HR CT image from an actual LR CT image, the actual LR CT image corresponding to low dose CT image data.

In an embodiment, there is provided a computer readable storage device. The device has stored thereon instructions configured to generate a high resolution (HR) computed tomography (CT) image from a low resolution (LR) CT image. The instructions that when executed by one or more processors result in the following operations including: generating, by a first generative neural network (G), a corresponding estimated HR image dataset based, at least in part, on a received training LR image dataset; comparing, by a first discriminative neural network ($D_Y$), a training HR image dataset and the estimated HR image dataset. The first generative neural network (G) and the first discriminative neural network ($D_Y$) are included in a first generative adversarial network (GAN). The operations further include generating, by a second generative neural network (F), a corresponding estimated LR image dataset based, at least in part, on the training HR image dataset; and comparing, by a second discriminative neural network ($D_X$), the training LR image dataset and the estimated LR image dataset. The second generative neural network (F) and the second discriminative neural network ($D_X$) are included in a second GAN. The operations further include determining, by an optimization module, an optimization function based, at least in part, on at least one of the estimated HR image dataset and/or the estimated LR image dataset. The optimization function contains at least one loss function. The operations further include adjusting, by the optimization module, a plurality of neural network parameters associated with at least one of the first GAN and/or the second GAN, to optimize the optimization function.

In some embodiments of the device, the at least one loss function is selected from the group including an adversarial loss function, a cyclic loss function, an identity loss function and a joint sparsifying transform loss function. In some embodiments of the device, the group further includes a supervision loss function.

In some embodiments of the device, the at least one loss function includes a cyclic loss function configured to implement a cycle consistency constraint.

In some embodiments of the device, the first generative neural network (G) and the second generative neural network (F) each include a respective feature extraction network and a respective reconstruction network, each feature extraction network including a plurality of skip connections.

In some embodiments of the device, the first discriminative neural network ($D_Y$) and the second discriminative neural network (DX) each include a respective plurality of discriminator blocks coupled in series, each discriminator block including a convolutional stage, a bias stage, an instance norm stage, and a leaky rectified linear unit (ReLU) stage.

In some embodiments, a computer readable storage device having stored thereon instructions that when executed by one or more processors result in the following operations including any one of the embodiments of the method.

BRIEF DESCRIPTION OF THE DRAWINGS

The drawings show embodiments of the disclosed subject matter for the purpose of illustrating features and advantages of the disclosed subject matter. However, it should be understood that the present application is not limited to the precise arrangements and instrumentalities shown in the drawings, wherein.

DETAILED DESCRIPTION

Figure 1A:
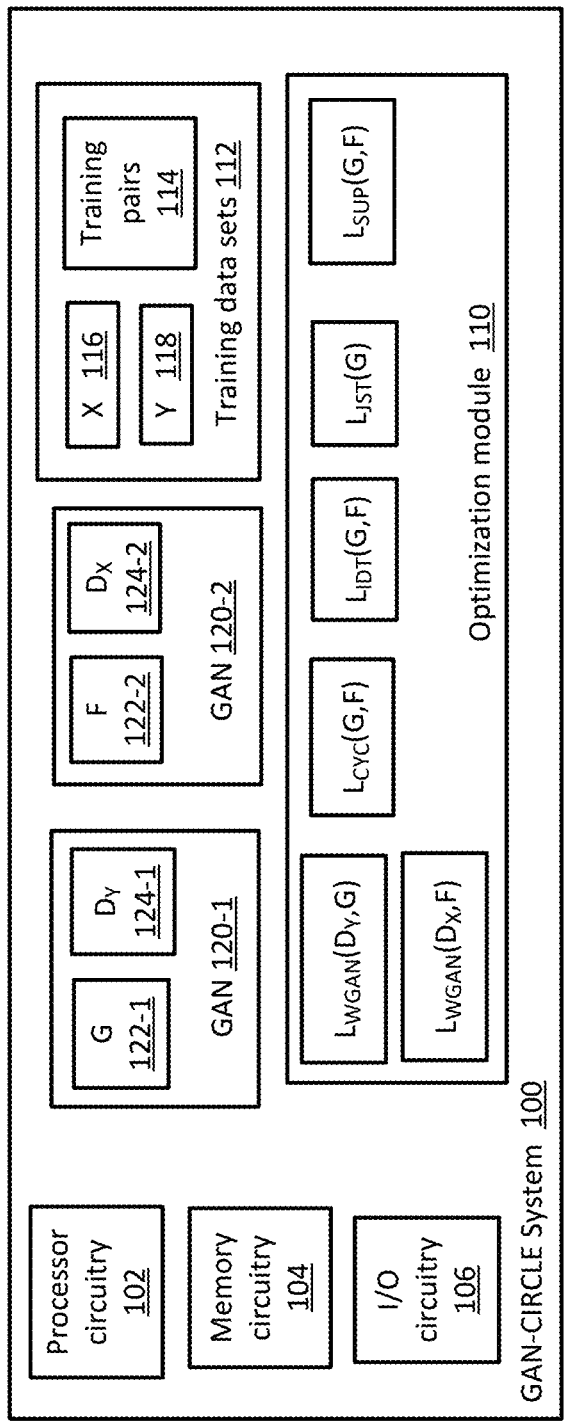
FIG. 1A illustrates a functional block diagram of a GAN-CIRCLE (generative adversarial network constrained by an identical, residual and cycle learning ensemble) system consistent with several embodiments of the present disclosure.

In general, there are two strategies for improving CT image resolution: (1) hardware oriented and (2) computation oriented. A hardware oriented strategy may utilize relatively more sophisticated hardware components including, for example, an x-ray tube with a relatively fine focal spot size, detector elements having a relatively small pitch, and/or improved mechanical precision for CT scanning. These hardware oriented methods may be relatively expensive, may increase radiation dose, and may compromise imaging speed. Computation oriented techniques are configured to obtain HRCT (high resolution computed tomography) images from LRCT (low resolution computed tomography) images (i.e., image datasets). Computation oriented techniques may thus avoid, at least, increased exposure to x-radiation. However, computation oriented techniques present a challenge of an ill-posed inverse problem.

Generally, the present disclosure relates to a CT super-resolution (SR) generative adversarial network (GAN) constrained by an identical, residual and cycle learning ensemble (GAN-CIRCLE). Super-resolution (SR) corresponds to generating a relatively high resolution image from a plurality of relatively low resolution image datasets. A GAN generally includes a generative network and a discriminative network and is typically trained using adversarial learning techniques. Adversarial learning is configured to enable a neural network to learn feature representations from complex data distributions. Adversarial learning by a generative adversarial network may correspond to a mini max game in which there are two competing players: the generative network and the discriminative network. In the game, the generative network is trained to learn a mapping from source images x in a source domain X (e.g., containing relatively low resolution images) to target images y in the target domain Y (e.g., containing relatively high resolution images). The discriminative network is configured to distinguish between generated (i.e., estimated) images ŷ from the generative network and provided target images y. A trained GAN may generally be able to model a relatively high dimensional distribution of target images.

An apparatus, method and/or system may include a residual convolutional neural network (CNN)-based network in a CycleGAN framework configured to preserve high-resolution anatomical details without task-specific regularization, as will be described in more detail below. Regularization corresponds to a process of introducing additional information to solve an ill-posed problem and/or to prevent overfitting. A cycle-consistency constraint may be used to enforce a relatively strong across-domain consistency between X and Y. The cycleGAN may include a plurality of GANs. The GANs may be trained using the Wasserstein distance (i.e., "Earth Moving" distance (EM distance)) loss function. The network may be optimized based, at least in part, on one or more design principles configured to alleviate computational overheads and to reduce a likelihood of over-fitting. The neural network may include a cascade of a plurality of layers configured to learn relatively highly interpretable and disentangled hierarchical features. The neural network may further include skip-connected layers to enable information flow across layers to reduce a likelihood of gradient vanishing. An L1 norm (i.e., sum of absolute values) may be employed to refine deblurring. A jointly constrained total variation-based regularization may be used configured to leverage prior information to reduce noise with a minimal loss in spatial resolution or anatomical information.

An apparatus, method and/or system for generating a high resolution (HR) computed tomography (CT) image from a low resolution (LR) CT image is described. The system may include a first generative adversarial network (GAN) and a second GAN. The first GAN includes a first generative neural network (G) configured to receive a training LR image dataset and to generate a corresponding estimated HR image dataset. The first GAN further includes a first discriminative neural network ($D_Y$) configured to compare a training HR image dataset and the estimated HR image dataset. The second GAN includes a second generative neural network (F) configured to receive the training HR image dataset and to generate a corresponding estimated LR image dataset. The second GAN further includes a second discriminative neural network ($D_X$) configured to compare the training LR image dataset and the estimated LR image dataset.

The system may further include an optimization module configured to determine an optimization function based, at least in part, on at least one of the estimated HR image dataset and/or the estimated LR image dataset. The optimization function contains at least one loss function. The optimization module is further configured to adjust a plurality of neural network parameters associated with the first GAN and the second GAN to optimize the optimization function.

Figure 1B:
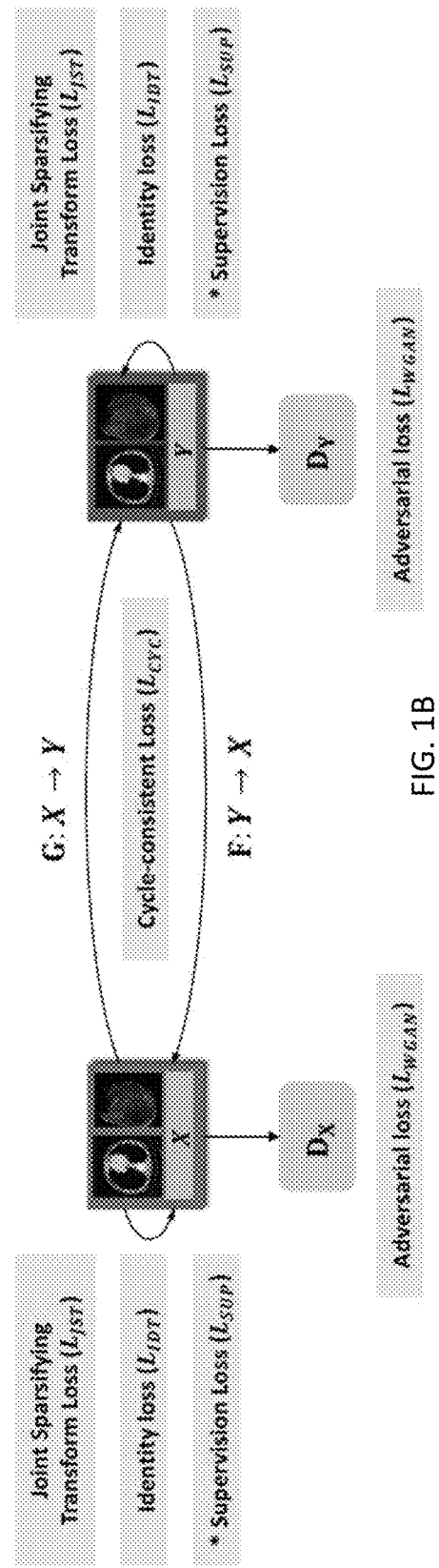
FIG. 1B illustrates a graphical representation of the GAN-CIRCLE system of FIG. 1A.

FIG. 1A illustrates a functional block diagram 100 of a GAN-CIRCLE system consistent with several embodiments of the present disclosure. FIG. 1B illustrates a graphical representation 150 of the GAN-CIRCLE system 100 of FIG. 1A. FIGS. 1A and 1B may be best understood when considered together. GAN-CIRCLE system 100 includes a processor circuitry 102, a memory circuitry 104 and an input/output (I/O) circuitry 106. GAN-CIRCLE system 100 further includes an optimization module 110, training data sets 112, a first generative adversarial network (GAN) 120-1 and a second GAN 120-2. The first GAN 120-1 includes a first generative neural network (G) 122-1 and a first discriminative neural network ($D_Y$) 124-1. The second GAN 120-2 includes a second generative neural network (F) 122-2 and a second discriminative neural network ($D_X$) 124-2.

The training data sets 112 may include image data from a first domain (X) 116, corresponding to relatively low resolution image data and image data from a second domain (Y) 118, corresponding to relatively high resolution image data. The training data sets 112 may further include training pairs 114. In one nonlimiting example, training pairs 114 may include paired low resolution CT image data sets and corresponding high resolution CT image data sets. In other words, each pair may include a low resolution CT image data set and a corresponding high resolution CT image data set.

The optimization module 110 may be configured to train the first GAN 120- and the second GAN 120-2 in a semi-supervised manner. Semi-supervised corresponds to supervised training with relatively few training pairs plus unsupervised learning utilizing elements of domain X and domain Y that are not necessarily matched.

As used herein, x∈X corresponds to an input LR image and a matrix y∈Y corresponds to an output HR image. In other words, x may correspond to a low resolution image dataset and y may correspond to a high resolution dataset. A formulation of the ill-posed linear SR problem may be written as:

$$x = SHy + \epsilon \quad (1)$$

where SH denote down-sampling and blurring system matrices, and c corresponds to noise and other factors. It may be appreciated that the system matrix and not-modeled factors may be non-linear, rather than being linear (i.e., may be neither scalable nor additive).

GAN-CIRCLE system 100 may be configured to computationally improve noisy LRCT images (e.g., obtained under a low-dose CT (LDCT) protocol) to HRCT images. Challenges in recovering HRCT images may include the following. LRCT images may contain different or relatively more complex spatial variations, correlations and statistical properties compared to natural images. Such characteristics of LR CT images may limit the SR imaging performance of the traditional methods. Second, noise in raw projection data may be introduced to the image domain during the reconstruction process, resulting in unique noise and artifact patterns. This creates difficulties for techniques configured to produce relatively high image quality results. Since the sampling and degradation operations are generally coupled and ill-posed, SR tasks may not be performed beyond a marginal degree using the traditional methods. Traditional methods may not effectively restore some fine features and may produce a blurry appearance and/or new artifacts. An apparatus, method and/or system, consistent with the present disclosure may include a number of non-linear SR functional blocks configured for SR CT (SRCT) imaging and may further include a residual module configured to learn high-frequency details. The apparatus, method and/or system may then be configured to perform adversarial learning in a cyclic manner to generate perceptually and quantitatively relatively better SRCT images.

Deep learning (DL)-based techniques may use feed-forward CNNs (convolutional neural networks) to learn non-linear mappings parameterized by θ, which can be written as:

$$\hat{y} = G_\theta(x) \quad (2)$$

In order to obtain an acceptable ŷ (i.e., an estimated HR image dataset), a suitable loss function is specified to encourage $G_\theta$ to generate a SR image based on the training samples so that $$\hat{\theta} = \underset{\theta}{\operatorname{argmin}} \sum_i \mathcal{L}(\hat{y}_i(\theta), y_i) \quad (3)$$

where ($x_i$, $y_i$) are paired LRCT and HRCT images for training.

The generative neural networks, i.e., generative networks G 122-1 and F 122-2, of GAN-CIRCLE system 100, correspond to two generative mappings G:X→Y (G) and F:Y→X (F) of GAN-CIRCLE system 150 given training samples $x_i \in X$ and $y_i \in Y$. The two mappings G and F may be jointly trained to produce synthesized images configured to confuse the adversarial discriminative networks (i.e., "discriminators") $D_Y$ (i.e., $D_Y$ 124-1) and $D_X$ (i.e., $D_X$ 124-2), respectively. The discriminative neural networks $D_Y$ and $D_X$ are configured to identify whether a respective output of each generative mapping is real or artificial. In other words, given an LR image x, G is configured to attempt to generate a synthesized (i.e., estimated) image ŷ that is relatively highly similar to an actual image y so as to fool $D_Y$. In a similar way, $D_X$ is configured to attempt to discriminate between a reconstructed (i.e., estimated) x̂ from F and an actual x. The generative networks (i.e., "generators") G, F and discriminators $D_Y$, $D_X$ are jointly/alternatively trained so as to improve their performance metrics synergistically. A corresponding optimization function may be written as:

$$\min_{G,F} \max_{D_Y, D_X} \mathcal{L}_{GAN}(G, D_Y) + \mathcal{L}_{GAN}(F, D_X) \qquad (4)$$

To enforce the mappings between the source and target domains and regularize the training procedure, GAN-CIRCLE system 100 (e.g., optimization module 110), 150 is configured to determine an optimization function that may include one or more of a plurality of types of loss functions. The loss functions may include, but are not limited to, adversarial loss (adv); cycle-consistency loss (cyc); identity loss (idt); and joint sparsifying transform loss (jst). The adversarial loss (adv) loss functions may include $L_{WGAN}(D_Y, G)$ and/or $L_{WGAN}(D_X, F)$. The cycle-consistency (cyc) loss function may correspond to $L_{CYC}(G,F)$. The identity (idt) loss function may correspond to $L_{IDT}(G,F)$. The joint sparsifying transform (jst) loss function may correspond to $L_{JST}(G)$. The GAN-CIRCLE system 100 (e.g., optimization module 110), 150 may be further configured to determine a supervised (sup) loss function when paired training data (e.g., training pairs 114) is available. The supervised (sup) loss function may correspond to $L_{SUP}(G,F)$. As used herein, loss function or norm may be indicated as L and/or $\mathcal{L}$, i.e., L and $\mathcal{L}$ may be used interchangeably.

For marginal matching, adversarial losses may be configured to urge the generated (i.e., estimated) images to obey empirical distributions in the source (e.g., X) and target (e.g., Y) domains. To improve the training quality, the GAN loss functions may include Wasserstein distance with gradient penalty. Thus, the adversarial objective (i.e., adversarial loss function) with respect to G may be written as:

$$\min_G \max_{D_Y} \mathcal{L}_{WGAN}(D_Y, G) = \qquad (5)$$
$$\mathbb{E}_x[D(G(x))] - \mathbb{E}_y[D(y)] + \lambda \mathbb{E}_{\tilde{y}}[(\|\nabla_{\tilde{y}} D(\tilde{y})\|_2 - 1)^2]$$

where $\mathbb{E}(\cdot)$ denotes the expectation operator. The first two terms are in terms of the Wasserstein estimation, and the third term is configured to penalize a deviation of the gradient norm of its input relative to one. The parameter ỹ is uniformly sampled along straight lines for pairs of G(x) and y, and λ is a regularization parameter, e.g., a hyper parameter. A similar adversarial loss function $$\min_F \max_{D_X} \mathcal{L}_{WGAN}(D_X, F)$$

may be defined for marginal matching in the reverse direction (i.e., Y to X).

To promote the consistency between F(G(x)) and x, the cycle-consistency loss may be written as:

$$\mathcal{L}_{CYC}(G,F) = \mathbb{E}_x[\|F(G(x))-x\|_1] + \mathbb{E}_y[\|G(F(y))-y\|_1] \qquad (6)$$

where $\|\cdot\|_1$ denotes the $\mathcal{L}_1$ norm. Since the cycle consistency loss encourages F(G(x))≈x and G(F(y))≈y, they may be referred to as "forward cycle consistency" and "backward cycle consistency", respectively. As used herein, domain adaptation mapping refers to the cycle-reconstruction mapping. In effect, domain adaptation mapping is configured to impose shared-latent space constraints to encourage the source content to be preserved during the cycle-reconstruction mapping. In other words, the cycle consistency may be configured to enforce latent codes deviating from the prior distribution in the cycle-reconstruction mapping. The cycle consistency may help prevent the degeneracy associated with adversarial learning.

It may be appreciated that an HR image should be a refined version of the LR counterpart. Thus, the identity loss may be used to regularize the training procedure. Compared with the $\mathcal{L}_2$ norm, the $\mathcal{L}_1$ norm may not over-penalize large differences or tolerate small errors between estimated images and target images. The $\mathcal{L}_1$ norm has a similar relatively fast convergence speed compared to the $\mathcal{L}_2$ norm. The $\mathcal{L}_{IDT}(G,F)$, determined using the $\mathcal{L}_1$ norm, may be formulated as:

$$\mathcal{L}_{IDT}(G,F) = \mathbb{E}_y[\|G(y)-y\|_1] + \mathbb{E}_y[\|F(x)-x\|_1] \qquad (7)$$

For the training baseline (as in the bi-directional mapping), the size of G(y) (or F(x)) is configured to be the same as that of y (or x).

For the Joint Sparsifying Transform Loss, a total variation (TV) is configured to perform relatively well in promoting image sparsity and reducing noise in piecewise-constant images. To express image sparsity, the Joint Sparsifying Transform loss function including a nonlinear TV-based loss with the joint constraints may be written as:

$$\mathcal{L}_{JST}(G) = \tau \|G(x)\|_{TV} + (1-\tau)\|y-G(x)\|_{TV} \qquad (8)$$

where τ is a scaling factor. It may be appreciated that the above constrained minimization combines two components: the first component is used for sparsifying reconstructed images and alleviating conspicuous artifacts, and the second helps preserve anatomical characteristics by minimizing the difference image y−G(x). These two components may be determined as a joint minimization under the bidirectional constraints. In one nonlimiting example, the control parameter τ was set to 0.5. In another nonlimiting example, for the case of τ=1, the $\mathcal{L}_{JST}(G)$ may be regarded as the conventional TV loss.

During training, the GAN-CIRCLE system 100, 150 may be fine-tuned in an end-to-end manner to minimize an overall objective function:

$$\mathcal{L}_{GAN\text{-}CIRCLE} = \mathcal{L}_{GAN}(D_Y,G) + \mathcal{L}_{WGAN}(D_X,F) + \lambda_1$$
$$\mathcal{L}_{CYC}(G,F) + \lambda_2 \mathcal{L}_{IDT}(G\,F) + \lambda_3 \mathcal{L}_{JST}(G) \qquad (9)$$

where $\lambda_1$, $\lambda_2$, and $\lambda_3$ are parameters for balancing among different penalties. As used herein, an optimization function may correspond to the overall objective function and optimizing the optimization function may correspond to minimizing the overall objective function. The overall objective function may further correspond to the GAN-CIRCLE, as described herein.

It may be appreciated that training data sets, e.g., training data sets 112, may include paired data sets, e.g., training pairs 114, and may include unpaired data, e.g., from the source domain, X, and the target domain, Y. In other words, availability of paired low resolution CT images and corresponding high-resolution CT images may be limited. Supervised training may generally utilize paired data sets. Unsupervised training may generally utilize low resolution image data from the source domain, X, and high-resolution image data from the target domain, Y, that are not paired, i.e., are not matched.

In the case where paired datasets are available (e.g., training pairs 114 contains paired LRCT and HRCT image datasets), the GAN-CIRCLE system 100, 150 may be trained in a supervised fashion. Thus, given training paired data from a joint data set, i.e., $(x,y) \sim P_{data}(X, Y)$, a supervision loss may be defined as:

$$\mathcal{L}_{SUP}(G,F) = \mathbb{E}_{(x,y)}[\|G(X)-y\|_1] + \mathbb{E}_{(x,y)}[\|F(y)-x\|_1] \quad (10)$$

Thus, GAN-CIRCLE system 100, 150 may be trained, supervised, unsupervised or semi-supervised (i.e., a combination of supervised and unsupervised). Optimization module 110 may be configured to determine an optimization function value based, at least in part, on at least one of an estimated HR image dataset (ŷ) and/or an estimated LR image dataset (x̂). The optimization function may contain at least one loss function. The optimization module 110 may be further configured to adjust a plurality of neural network parameters to optimize the optimization function, as will be described in more detail below.

Figure 2:
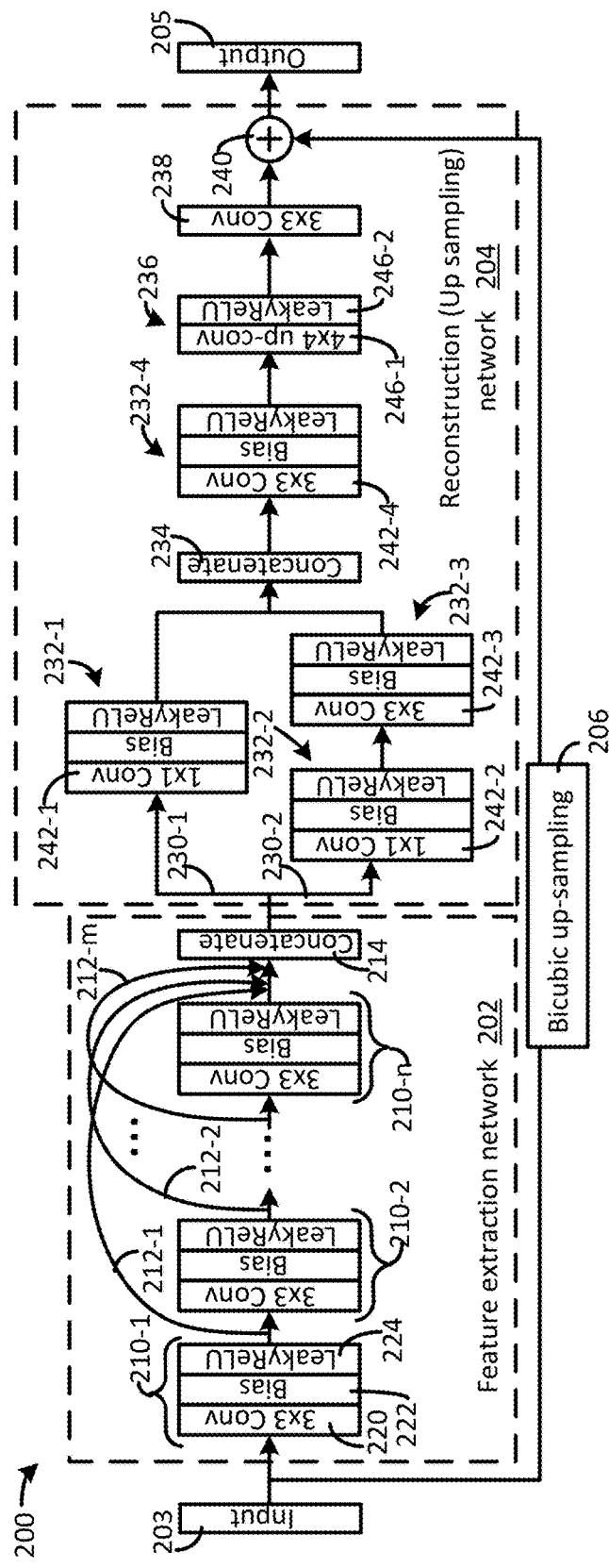
FIG. 2 illustrates a functional block diagram of a generative neural network consistent with several embodiments of the present disclosure.

FIG. 2 illustrates a functional block diagram 200 of a generative neural network consistent with several embodiments of the present disclosure. Generative neural network (i.e., "generator") 200 is one example of generative neural network 122-1 and/or generative neural network 122-2 of FIG. 1. Generator 200 includes a feature extraction network 202 and a reconstruction (i.e., up sampling) network 204, thus, generator 200 may include two processing streams. The feature extraction network 202 may correspond to a first processing stream and the reconstruction network 204 may correspond to a second processing stream. Generator 200 further includes a bicubic up-sampling stage 206.

Generator 200 is configured to receive an input image 203 and to provide an output image 205. In one nonlimiting example, the input image 203 may correspond to CT image data. The input CT image data may be relatively low resolution, i.e., from domain X, or relatively high resolution, i.e., from domain Y, as described herein. In one nonlimiting example, the output image 205 may correspond to generated, i.e., estimated, CT image data. The output CT image data may be related to domain Y and may thus be relatively high resolution or may be related to domain X and may thus be relatively low resolution. Thus, feature extraction network 202 is configured to receive the input image 203 and reconstruction network 204 is configured to provide as output the estimated image 205.

Feature extraction network 202 includes a plurality of nonlinear SR feature blocks 210-1, 210-2, . . . , 210-n, a plurality of skip connections 212-1, 212-2, . . . , 212-m and a concatenate block 214. The plurality of nonlinear SR feature blocks 210-1, 210-2, . . . , 210-n are coupled in series with a first nonlinear SR feature block 210-1 configured to receive the input image data 203 and an output of the $n^{th}$ nonlinear SR feature block 210-n coupled to the concatenate block 214. Each skip connection is configured to couple an output of a respective nonlinear SR feature block 210-1, 210-2, . . . , 210-(n−1), to the input of the concatenate block 214. In one nonlimiting example, the number of nonlinear SR feature blocks, N, may be equal to 12 and the number of skip connections, N−1, may be equal to 11. However, this disclosure is not limited in this regard.

Each nonlinear SR feature block, e.g., nonlinear SR feature block 210-1, may include a convolutional layer 220, a bias layer 222, a leaky rectified linear unit (leaky ReLU) 224, and a dropout layer. In one nonlimiting example, the convolutional layer 220 may correspond to a 3×3 convolution kernel. A default stride for each nonlinear SR feature block is 1, except the first nonlinear SR feature block 210-1 in which the stride for the convolutional layer is 2.

The Leaky ReLU 224 is configured to prevent a "dead ReLU" problem. A dead ReLU always outputs a same value (e.g., zero) for any input. A leaky ReLU (e.g., max(0, x)-α max(0, −x)) is configured to facilitate recovery from a dead ReLU. Application of the dropout layer is configured to prevent overfitting. "Dropout" refers to ignoring units (i.e. neurons) during the training phase of certain set of neurons that is selected at random. "Ignoring" means that these units are not considered during a selected forward or backward pass. At each training stage, individual nodes are either dropped out of the network with probability 1-p or kept with probability p, so that a reduced network remains.

Table 1A includes a respective number of filters (i.e., convolution kernels) for the respective convolutional layer included in each nonlinear SR feature block.

TABLE 1A

| SR block | 210-1 | 210-2 | 210-3 | 210-4 | 210-5 | 210-6 | 210-7 | 210-8 | 210-9 | 210-10 | 210-11 | 210-12 |
|---|---|---|---|---|---|---|---|---|---|---|---|---|
| Num. filters | 64 | 54 | 48 | 43 | 39 | 35 | 31 | 28 | 25 | 22 | 18 | 16 |

In practice, normalization is generally avoided since normalization is not suitable for SR. For example, normalization may discard a range flexibility of the features. To capture both local and the global image features, all outputs of the hidden layers may be concatenated by the concatenate block 214 prior to provision to the reconstruction network 204 through skip connections 212-1, 212-2, . . . , 212-m. The skip connections are configured to facilitate avoiding training saturation and overfitting. Diverse features which represent different details of the HRCT image components can be constructed in the end of feature extraction network.

The reconstruction network 204 includes two reconstruction branches 230-1, 230-2 and is configured to integrate the information flows. A first reconstruction branch 230-1 includes a first reconstruction block 232-1. A second reconstruction branch 230-2 includes two reconstruction blocks 232-2, 232-3 arranged in series. The reconstruction network 204 further includes a concatenate block 234, a fourth reconstruction block 232-4 and up sampling block 236 and a convolution layer 238 arranged in series. An output of the convolution layer 238 is coupled to a summer 240. An output of the bicubic upsampling block 206 is also coupled to the summer 240. The bicubic upsampling block 206 is configured to receive the input image data 203.

The reconstruction blocks 232-1, . . . , 232-4, each include a convolutional layer, a bias layer and a leaky ReLU layer. A first convolutional layer 242-1 of the first reconstruction block 232-1 and a second convolutional layer 242-2 of the second reconstruction block 232-2 each corresponds to a 1×1 convolution layer. A third convolutional layer 242-3 of the third reconstruction block 232-3 and a fourth convolutional layer 242-4 of the fourth reconstruction block 232-4 each corresponds to a 3×3 convolution layer. The up sampling block 236 includes a 4×4 up convolution layer 246-1 followed by a leaky ReLU layer 246-2.

Table 1B includes a respective number of filters for the respective convolutional layer included in each reconstruction block 242-1, . . . 242-4, the up sampling block 236 and the output 205.

TABLE 1B

| Block ID | 232 - 1 | 232 - 2 | 232 - 3 | 232 - 4 | 236 | Output |
|---|---|---|---|---|---|---|
| Num. filters | 24 | 8 | 8 | 32 | 16 | 1 |

It may be appreciated that all the outputs from the feature extraction network 202 may be relatively densely connected. The reconstruction network 204 may thus correspond to a "Network in Network" of parallelized CNNs that is configured to use shallow multilayer perceptron (MLP) to perform a nonlinear projection in the spatial domain. The Network in Network strategy may provide a number of benefits. Each 1×1 Cony layer, e.g., the first and second convolution layers 242-1, 242-2, can significantly reduce the dimensionality of the filter space for faster computation with less information loss. Each 1×1 Cony layer may increase the non-linearity of the network to learn a complex mapping better at the finer levels. Up-sampling may correspond to transposed convolutional (up-sampling) layers, up sampled by a scale of 2. The last Cony layer, e.g., convolution layer 238 may be configured to fuse all the feature maps, resulting in an entire residual image containing mostly high-frequency details. In the supervised setting, the up-sampled image by the bicubic interpolation layer 206 may be combined (via element-wise addition) by summer 240 with the residual image to produce a HR output. In the unsupervised and semi-supervised settings, no interpolation is involved across the skip connection.

It may be appreciated that the generator F shares the same architecture as G in both the supervised and unsupervised scenarios. In one nonlimiting example, the default stride size is 1. For unsupervised feature learning, and another non-limiting example, the stride of the Cony layers is 2 in the first feature blocks. For supervised feature learning, the stride of the Cony layers may be 2 in the first and second feature blocks of F. The forward generative network G may be referred to as G-Forward.

Figure 3:
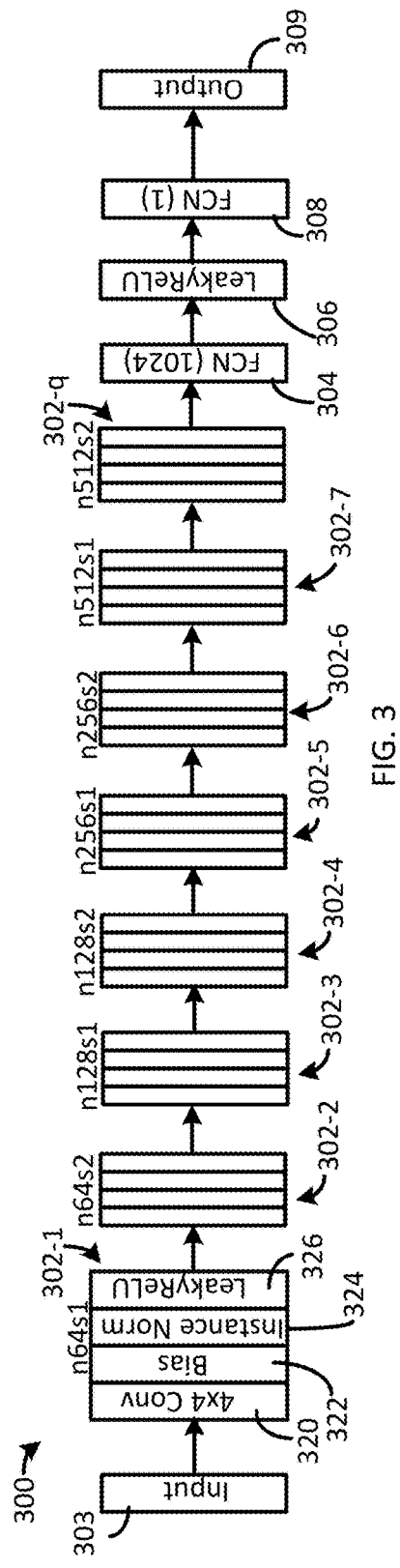
FIG. 3 illustrates a functional block diagram of a discriminative neural network consistent with several embodiments of the present disclosure.

FIG. 3 illustrates a functional block diagram 300 of a discriminative neural network consistent with several embodiments of the present disclosure. Discriminative neural network 300 is one example of discriminative neural network 124-1 and/or discriminative neural network 124-2 of FIG. 1. Discriminative neural network 300 is configured to receive an input image 303 and to provide an output decision 309. In one nonlimiting example, the input image 303 may correspond to CT image data.

Discriminative neural network 300 includes a plurality of discriminator blocks 302-1, 302-2, . . . , 302-q, coupled in series. In one nonlimiting example, discriminative neural network 300 may include Q=8 discriminator blocks. However, this disclosure is not limited in this regard. Discriminative neural network 300 further includes a first fully convolutional network (FCN) layer 304, a Leaky ReLU 306 and a second FCN layer 308, coupled in series. A last discriminator block 302-q is coupled to the first FCN layer 304 and the second FCN layer 308 is configured to provide the output of the discriminative neural network 300. The first FCN layer 304 includes 1024 units and the second FCN stage 308 as one output. It may be appreciated that the discriminative neural network 300 does not include a sigmoid cross entropy layer.

Each discriminator block, e.g., discriminator block 302-1, includes a 4×4 filter size convolutional stage 320, a bias stage 322, an instance norm (IN) stage 324 and a leaky ReLU stage 326. Each discriminator block has a respective number of filters (i.e., convolutional kernels), n, and a respective stride, s. Table 2 includes the number of filters and the stride for each discriminator block 302-1, . . . , 302-q.

TABLE 2

| Discr. Block | 302 - 1 | 302 - 2 | 302 - 3 | 302 - 4 | 302 - 5 | 302 - 6 | 302 - 7 | 302 - q |
|---|---|---|---|---|---|---|---|---|
| Num. filters | 64 | 64 | 128 | 128 | 256 | 256 | 512 | 512 |
| Stride | 1 | 2 | 1 | 2 | 1 | 2 | 1 | 2 |

In operation, the weights of the convolutional layers may be initialized. The std (i.e., standard deviation) may be determined in the manner of $\sqrt{2/m}$ where $m=f_s^2 \times n_f$, $f_s$ is the filter size, and $n_f$ is the number of filters. For example, given $f_s=3$ and $n_f=16$, std=0.118 and all bias may be initialized to 0. In one nonlimiting example, in the training process, $\lambda_1$, $\lambda_2$, $\lambda_3$ may be empirically set to 1, 0.5, 0.001, respectively. Dropout regularization with p=0.8 may be applied to each convolutional layer. Each of the convolutional layers and transposed convolutional layers may then be followed by a respective Leaky ReLu with a slope $\alpha=0.1$. To make the size of all feature maps the same as that of the input, zero padding may be applied around the boundaries before the convolution. An Adam optimizer with $\beta_1=0.5$, $\beta_2=0.9$ may be utilized to minimize the loss function of the GAN-CIRCLE network. The learning rate may be set to $10^{-4}$ for all layers and then decreased by a factor of 2 for every 50 epochs. The training may be terminated after 100 epochs. The experiments may be conducted using a TensorFlow library on a NVIDIA TITAN XP GPU.

It may be appreciated that tuning the hyperparameters facilitates understanding model performance. In one nonlimiting example, a grid search was performed on the hyperparameters $\lambda_1$, $\lambda_2$, $\lambda_3$, that were selected from the set $\{0, 0.01, 0.05, 0.1, 0.5, 1.0, 10, 20, \infty\}$. First, the parameter $\lambda_1 \in \{0, 0.01, 0.05, 0.1, 0.5, 1.0, 10, 20, \infty\}$ when $\lambda_2=0$, $\lambda_3=0$, was selected. The hyperparameter $\lambda_1=\infty$ ($\lambda_1=0$) indicates that the SR model was optimized with respect to the cycle-consistency loss (the adversarial loss). In this scheme, the performance of the SR model on the validation dataset was investigated. The results demonstrate that the parameter $\lambda_1=1$ achieved the highest PSNR value. Then, the hyperparameter $\lambda_2$ was selected based on the performance on the validation set, and then the retrained model was used for computing the corresponding PSNR values when $\lambda_3=0$. The performance on the validation set with different hyperparameter $\lambda_3$ values. It was observed that the $\lambda_1=1$, $\lambda_2=0.5$, $\lambda_3=0.01$ achieved the best PSNR values. It was further observed that the cycle consistency loss, identity loss, and joint sparsifying transform loss may improve the average PSNR values.

In some embodiments, image data may be preprocessed prior to provision to a GAN-CIRCLE system, as described herein. In one nonlimiting example, the original CT images may first be scaled from the CT Hounsfield Value (HU) to the unit interval [0,1], and treated as the ground-truth HRCT images. LR images may then be generated by adding noise to the original images and then lowering the spatial resolution by a factor of 2. For convenience in training GAN-CIRCLE, the LR image may be up-sampled via proximal interpolation to ensure that x and y are of the same size.

Since the amount of training data plays a role in training neural networks, overlapping patches were extracted from LRCT and HRCT images rather than directly feeding the entire CT images to the training pipeline. The overlapped patches were obtained with a predefined sliding size. This strategy preserves local anatomical details, and boost the number of samples. The HRCT images were randomly cropped into patches of 64×64, along with their corresponding LRCT patches of size 32×32 at the same center point for supervised learning. With the unsupervised learning methods, the size of the HRCT and LRCT patches are 64×64 in batches of size 64.

Thus, a CT super-resolution (SR) generative adversarial network (GAN) constrained by an identical, residual and cycle learning ensemble (GAN-CIRCLE) has been described. Adversarial learning is configured to enable a neural network to learn feature representations from complex data distributions. Adversarial learning by a generative adversarial network may correspond to a mini max game in which there are two competing players: the generative network and the discriminative network. A trained GAN may generally be able to model a relatively high dimensional distribution of target images. Thus, a GAN-CIRCLE system, consistent with the present disclosure may computationally improve noisy LRCT images (e.g., obtained under a low-dose CT (LDCT) protocol) to HRCT images.

Figure 4:
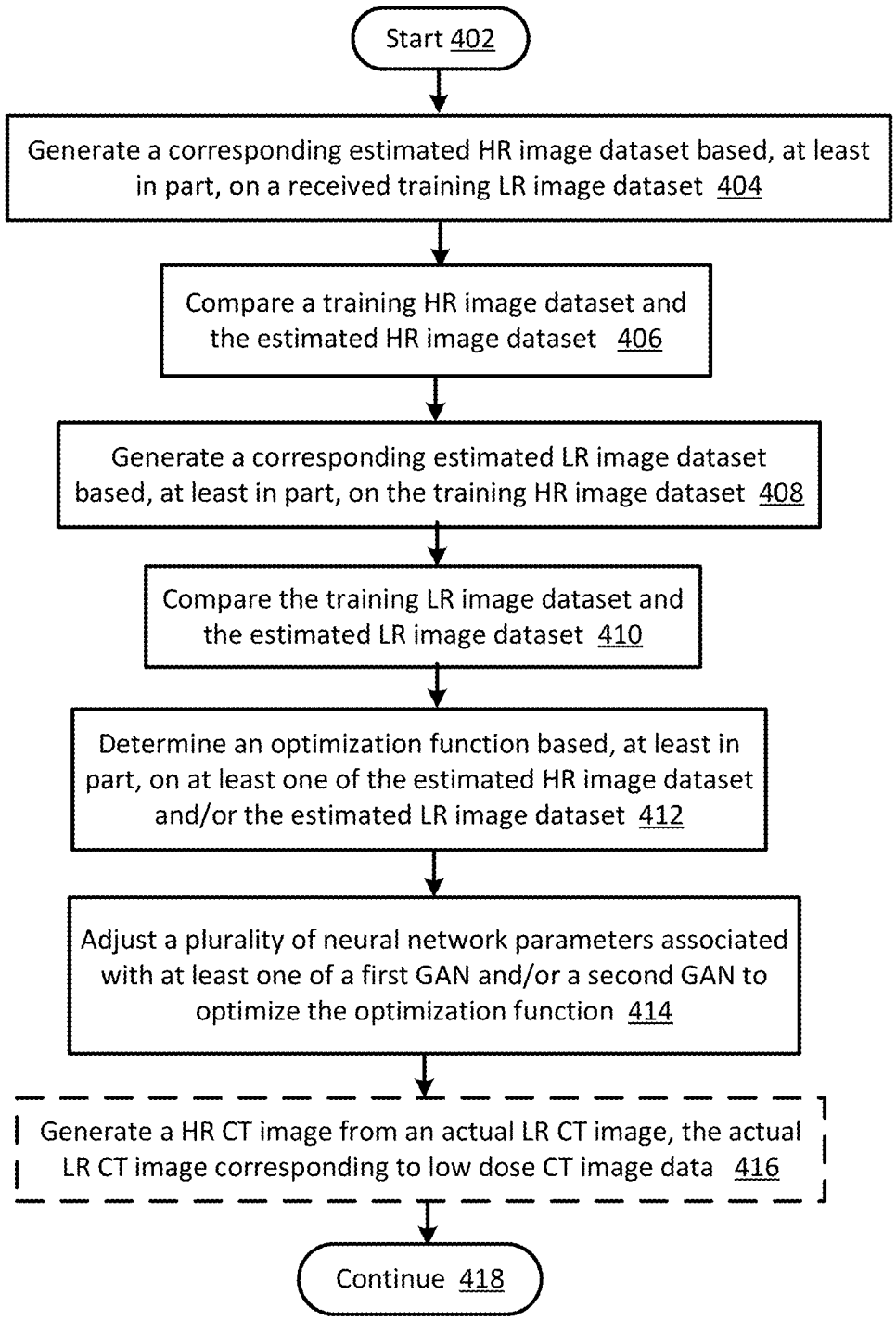
FIG. 4 is a flow chart of GAN-CIRCLE operations according to various embodiments of the present disclosure

FIG. 4 is a flowchart 400 of GAN-CIRCLE operations according to various embodiments of the present disclosure. In particular, the flowchart 400 illustrates training a neural network for generating a high resolution (HR) computed tomography (CT) image from a low resolution (LR) CT image. The operations may be performed, for example, by GAN-CIRCLE system 100 (e.g., GANs 120-1, 120-2 and optimization module 110) of FIG. 1A.

Operations of this embodiment may begin with start 402. Operation 404 includes generating a corresponding estimated HR image dataset based, at least in part, on a received training LR image dataset. The generating may be performed by a first generative neural network (G). Operation 406 includes comparing a training HR image dataset and the estimated HR image dataset. The comparing may be performed by a first discriminative neural network ($D_Y$). The first generative neural network (G) and the first discriminative neural network ($D_Y$) are included in a first generative adversarial network (GAN).

Operation 408 includes generating a corresponding estimated LR image dataset based, at least in part, on the training HR image dataset. The generating may be performed by a second generative neural network (F). Operation 410 includes comparing the training LR image dataset and the estimated LR image dataset. The comparing may be performed by a second discriminative neural network ($D_X$). The second generative neural network (F) and the second discriminative neural network ($D_X$) are included in a second GAN. Operation 412 includes determining an optimization function based, at least in part, on at least one of the estimated HR image dataset and/or the estimated LR image dataset. The determining may be performed by an optimization module. The optimization function contains at least one loss function. Operation 414 includes adjusting a plurality of neural network parameters associated with at least one of the first GAN and/or the second GAN to optimize the optimization function. The adjusting may be performed by the optimization module.

In some embodiments, flowchart 400 may include generating a HR CT image from an actual LR CT image, the actual LR CT image corresponding to low dose CT image data at operation 416. Program flow may then continue at operation 418.

Thus, a neural network for generating a high resolution (HR) computed tomography (CT) image from a low resolution (LR) CT image may be trained.

Experimental Data

To assess performance, three variations of the proposed method (i.e., models) were evaluated: (1) G-Forward (G-Fwd), corresponding to the forward generator (G) of GAN-CIRCLE system 100, (2) G-Adversarial (G-Adv), which uses the adversarial learning strategy, and (3) the full GAN-CIRCLE, e.g., GAN-CIRCLE system 100, 150 of FIGS. 1A and 1B. The three models were first trained using a supervised learning strategy. The GAN-CIRCLE was then trained in a semi-supervised scenario ("GAN-CIRCLE$^s$") and then implemented in an unsupervised manner ("GAN-CIRCLE$^{ss}$"). In the semi-supervised settings, two datasets were created separately by randomly splitting the dataset into the paired and unpaired dataset with respect to three variants: 100%, 50%, and 0% paired. To better evaluate the performance of each method, the same size of the dataset was for training and testing.

The SR performance was evaluated in terms of three image quality metrics: Peak signal-to-noise ratio (PSNR), Structural Similarity (SSIM), and Information Fidelity Criterion (IFC). Through extensive experiments, the three methods were evaluated on the two benchmark datasets: a tibia dataset and an abdominal dataset.

GAN-CIRCLE achieves the second best values in terms of SSIM and IFC. The IFC value may generally correlate well with the human perception of SR images. GAN-CIRCLE$^s$ obtained comparable results qualitatively and quantitatively. Table 3 shows that the proposed semi-supervised method performs similarly compared to the fully supervised methods on the tibia dataset and the abdominal dataset. In general, GAN-CIRCLE, consistent with the present disclosure may generate relatively more pleasant results with relatively sharper image contents.

TABLE 3

|  | Tibia Case | | | Abdominal Case | | | Real Case 1 | | | Real Case 2 | | |
| --- | --- | --- | --- | --- | --- | --- | --- | --- | --- | --- | --- | --- |
|  | PSNR | SSIM | IFC | PSNR | SSIM | IFC | PSNR | SSIM | IFC | PSNR | SSIM | IFC |
| A+ | 26.496 | 0.696 | 3.028 | 28.154 | 0.589 | 1.899 | 27.877 | 0.804 | 0.249 | 27.037 | 0.778 | 0.236 |
| FSRCNN | 28.360 | 0.923 | 3.533 | 30.950 | 0.924 | 2.285 | 35.384 | 0.830 | 0.265 | 33.643 | 0.805 | 0.237 |
| ESPCN | 28.361 | 0.921 | 3.520 | 30.507 | 0.923 | 2.252 | 35.378 | 0.830 | 0.278 | 33.689 | 0.805 | 0.245 |
| LapSRN | 28.486 | 0.923 | 3.533 | 30.985 | 0.926 | 2.299 | 35.372 | 0.830 | 0.277 | 33.711 | 0.805 | 0.244 |
| SRGAN | 21.924 | 0.389 | 1.620 | 28.550 | 0.871 | 1.925 | 33.002 | 0.737 | 0.232 | 31.775 | 0.701 | 0.220 |
| G-Fwd | 28.649 | 0.931 | 3.618 | 31.282 | 0.928 | 2.348 | 35.227 | 0.829 | 0.276 | 33.589 | 0.803 | 0.236 |
| G-Adv | 26.945 | 0.676 | 2.999 | 26.930 | 0.889 | 1.765 | 32.518 | 0.725 | 0.199 | 31.712 | 0.700 | 0.210 |
| GAN-CIRCLE | 27.742 | 0.895 | 3.944 | 30.720 | 0.924 | 2.436 | — | — | — | — | — | — |
| GAN-CIRCLE$^s$ | 28.402 | 0.907 | 3.943 | 29.988 | 0.902 | 2.367 | 33.194 | 0.829 | 0.283 | 31.252 | 0.804 | 0.246 |
| GAN-CIRCLE$^u$ | 27.255 | 0.891 | 2.713 | 28.439 | 0.894 | 2.019 | 32.138 | 0.824 | 0.283 | 30.641 | 0.796 | 0.232 |

Corresponding image analysis indicates that GAN-CIRCLE and GAN-CIRCLE' are capable of retaining high-frequency details to reconstruct more realistic images with relatively lower noise compared with the other GAN-based methods (G-Adv, SRGAN). The results in Table 3 indicate that G-Fwd achieves the best performance in PSNR. GAN-CIRCLE and GAN-CIRCLE$^s$ both obtain relatively pleasing results in terms of SSIM and IFC. In other words, the results show that the proposed GAN-CIRCLE and GAN-CIRCLEs generate relatively visually pleasant results with sharper edges on the abdominal dataset.

Table 3 further includes results ("Real case") from a test subject (deceased mouse). Three LRCT and HRCT image pairs were first obtained of the test subject on the same scanner with two scanning protocols. The micro-CT parameters are as follows: X-ray source circular scanning, 60 kVp, 134 mAs, 720 projections over a range of 360 degrees, exposure 50 ms per projection, and the micro-CT images were reconstructed using the Feldkamp-Davis-Kress (FDK) algorithm: HRCT image size 1450×1450, 600 slices at 24 µm isotropic voxel size, and the LRCT image size 725×725, 300 slices at 48 µm isotropic voxel size. Since the real data are unmatched, the GAN-CIRCLE' and GAN-CIRCLE" networks were evaluated for 1× resolution improvement.

Effect of Network Architecture Variation

Filter Size: With a fixed filter size of the reconstruction network, the filter size of the feature extraction network was enlarged to 5×5 and 7×7, respectively. Note that all the other settings remained unchanged. The average PSNR with the filter size 3×3 is slightly higher than that with the filter size 5×5 and 7×7. In general, the reasonably larger filter size could help capture larger structural features, leading to a performance gain. In the case of the Tibia dataset, utilizing filter size 3×3 is sufficient to grasp small structural information. Considering the tiny structural texture with small pixel size in the case of bone images, the filter size 3×3 may be good enough.

Number of Layers: Different network depths were evaluated by adjusting the number of non-linear mapping layers in the feature extraction network to 6, 9, 12, 15 layers respectively in the case of the Tibia dataset. Note that all the other settings remained unchanged. The GAN-CIRCLE used a twelve-layer network. The twelve-layer network appears to be better than the six-layer and nine-layer networks, respectively. However, deeper networks do not always perform better. Specifically, the performance of the fifteen-layer network did not outperform the twelve-layer network.

Training Patch Size: In general, the benefit of training a CNN-based network with patches is two-fold. First, a properly truncated receptive field can reduce the complexity of the network while still capturing the richness of local anatomical information. Second, the use of patches significantly increases the number of training samples. Experiments were performed with patch sizes 48×48, 64×64, 80×80, and 96×96 respectively on the Tibia dataset. It is observed that large training patch sizes do not show any improvement in term of the average PSNR. Thus, a patch size 64×64 was used for experiments.

Summary

SR imaging may provide multiple benefits in medical applications, e.g., depicting bony details, lung structures, and implanted stents, and potentially enhancing radiomics analysis. As a result, X-ray computed tomography can provide a practical benefit in biological evaluation.

High resolution micro-CT is well-suited for bone imaging. Osteoporosis, characterized by reduced bone density and structural degeneration of bone, greatly diminishes bone strength and increases the risk of fracture. Histologic studies have demonstrated that bone micro-structural properties can be strong determinants of bone strength and fracture risk. Modern whole-body CT technologies, benefitting from high spatial resolution, ultra-high speed scanning, relatively low dose radiation, and large scan length, allows quantitative characterization of bone micro-structure.

The use of the adversarial learning (with unpaired training data) as the regularization term for SR imaging, as described herein, may facilitate capturing anatomical information. The semi-supervised methods, as described herein, achieved promising quantitative results. The cycle-consistency is configured to facilitate learning a complex deterministic mapping to improve image quality. The enforcement of identity and supervision allows the system to master more latent structural information to improve image resolution. The Wasserstein distance is configured to stabilize the GAN training process. The generative neural network includes a relatively efficient CNN-based network with skip-connection and network in network techniques. In the feature extraction network, the network structures have been optimized and the computational complexity reduced by applying a small amount of filters in each Cony layer and utilizing the ensemble learning model. Both local and global features are cascaded through skip connections before being fed into the restoration/reconstruction network.

As used in any embodiment herein, the terms "logic" and/or "module" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hard-wired circuitry, programmable circuitry such as computer processors comprising one or more individual instruction processing cores, state machine circuitry, and/or firmware that stores instructions executed by programmable circuitry. The logic (and/or module) may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

The foregoing provides example system architectures and methodologies, however, modifications to the present disclosure are possible. The processor circuitry 102 may include one or more processing units and may be configured to perform operations of one or more circuitries, modules and/or artificial neural networks. Processing units may include, but are not limited to, general-purpose processing units, graphical processing units, parallel processing units, etc.

Memory circuitry 104 may each include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may include other and/or later-developed types of computer-readable memory.

Input/output (I/O) circuitry 106 may be configured to receive input data (e.g., low resolution CT image data sets) and/or transmit output data (e.g., high-resolution CT image data). In one nonlimiting example, the input data may be received from a low dose CT scanner.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

What is claimed is:

1. A system for generating a high resolution (HR) computed tomography (CT) image from a low resolution (LR) CT image, the system comprising:
   a first generative adversarial network (GAN) comprising:
      a first generative neural network (G) configured to generate an estimated HR image based, at least in part, on a received LR image, and
      a first discriminative neural network ($D_Y$) configured to compare the estimated HR image and a received training HR image; and
   an optimization module configured to determine an optimization function based, at least in part, on the estimated HR image, the optimization function containing at least one loss function, the optimization module further configured to adjust a plurality of neural network parameters associated with the first GAN, to optimize the optimization function.

2. The system of claim 1, wherein the at least one loss function is selected from the group comprising an adversarial loss function configured to implement a Wasserstein distance with gradient penalty, a cyclic loss function configured to implement a cycle consistency constraint, an identity loss function and a joint sparsifying transform loss function.

3. The system of claim 1, wherein the at least one loss function comprises a cyclic loss function and the received LR image corresponds to a reconstructed LR image received from a second generative neural network (F), F included in a second GAN, the second GAN further comprising a second discriminative neural network ($D_X$).

4. The system of claim 1, wherein the at least one loss function comprises a cyclic loss function configured to implement an $\mathcal{L}_1$ norm.

5. The system of claim 1, wherein the first generative neural network (G) comprises a feature extraction network and a reconstruction network, the feature extraction network comprising a plurality of skip connections.

6. The system of claim 1, wherein the first discriminative neural network ($D_Y$) comprises a plurality of discriminator blocks coupled in series, each discriminator block comprising a convolutional stage, a bias stage, an instance norm stage, and a leaky rectified linear unit (ReLU) stage.

7. The system of claim 1, wherein a trained first generative neural network (G) is configured to generate a HR CT image from an actual LR CT image, the actual LR CT image corresponding to low dose CT image data.

8. A method for generating a high resolution (HR) computed tomography (CT) image from a low resolution (LR) CT image, the method comprising:
   generating, by a first generative neural network (G), an estimated HR image based, at least in part, on a received LR image;
   comparing, by a first discriminative neural network ($D_Y$), the estimated HR image and a received training HR image, the first generative neural network (G) and the first discriminative neural network ($D_Y$) included in a first generative adversarial network (GAN);
   determining, by an optimization module, an optimization function based, at least in part, on the estimated HR image, the optimization function containing at least one loss function; and
   adjusting, by the optimization module, a plurality of neural network parameters associated with the first GAN, to optimize the optimization function.

9. The method of claim 8, wherein the at least one loss function is selected from the group comprising an adversarial loss function configured to implement a Wasserstein distance with gradient penalty, a cyclic loss function configured to implement a cycle consistency constraint, an identity loss function and a joint sparsifying transform loss function.

10. The method of claim 8, wherein the at least one loss function comprises a cyclic loss function and the received LR image corresponds to a reconstructed LR image received from a second generative neural network (F), F included in a second GAN, the second GAN further comprising a second discriminative neural network ($D_X$).

11. The method of claim 8, wherein the at least one loss function comprises a cyclic loss function configured to implement an $\mathcal{L}_1$ norm.

12. The method of claim 8, wherein the first generative neural network (G) comprises a feature extraction network and a reconstruction network, the feature extraction network comprising a plurality of skip connections.

13. The method of claim 8, wherein the first discriminative neural network ($D_Y$) comprises a plurality of discriminator blocks coupled in series, each discriminator block comprising a convolutional stage, a bias stage, an instance norm stage, and a leaky rectified linear unit (ReLU) stage.

14. The method of claim 8, further comprising generating, by a trained first generative neural network (G), a HR CT image from an actual LR CT image, the actual LR CT image corresponding to low dose CT image data.

15. A computer readable storage device having stored thereon instructions configured to generate a high resolution (HR) computed tomography (CT) image from a low resolution (LR) CT image, the instructions that when executed by one or more processors result in the following operations comprising:
  generating, by a first generative neural network (G), an estimated HR image based, at least in part, on a received LR image;
  comparing, by a first discriminative neural network ($D_Y$), the estimated HR image and a received training HR image, the first generative neural network (G) and the first discriminative neural network ($D_Y$) included in a first generative adversarial network (GAN);
  determining, by an optimization module, an optimization function based, at least in part, on the estimated HR image, the optimization function containing at least one loss function; and
  adjusting, by the optimization module, a plurality of neural network parameters associated with the first GAN, to optimize the optimization function.

16. The device of claim 15, wherein the at least one loss function is selected from the group comprising an adversarial loss function configured to implement a Wasserstein distance with gradient penalty, a cyclic loss function configured to implement a cycle consistency constraint, an identity loss function and a joint sparsifying transform loss function.

17. The device of claim 15, wherein the at least one loss function comprises a cyclic loss function and the received LR image corresponds to a reconstructed LR image received from a second generative neural network (F), F included in a second GAN, the second GAN further comprising a second discriminative neural network ($D_X$).

18. The device of claim 15, wherein the at least one loss function comprises a cyclic loss function configured to implement an $\mathcal{L}_1$ norm.

19. The device of claim 15, wherein the first generative neural network (G) comprises a feature extraction network and a reconstruction network, the feature extraction network comprising a plurality of skip connections.

20. The device of claim 15, wherein the first discriminative neural network ($D_Y$) comprises a plurality of discriminator blocks coupled in series, each discriminator block comprising a convolutional stage, a bias stage, an instance norm stage, and a leaky rectified linear unit (ReLU) stage.

\* \* \* \* \*